United States Patent
Lev-Ami et al.

(10) Patent No.: US 6,993,404 B2
(45) Date of Patent: Jan. 31, 2006

(54) GRAPHICAL USER INTERFACE WITH PROCESS QUALITY INDICATOR

(75) Inventors: Uzi Lev-Ami, Mountain View, CA (US); Guenter Sifnatsch, Santa Clara, CA (US); Mark Attwood, Morgan Hill, CA (US)

(73) Assignee: MKS Instruments, Inc., Andover, MA (US)

( * ) Notice: Subject to any disclaimer, the term of this patent is extended or adjusted under 35 U.S.C. 154(b) by 71 days.

(21) Appl. No.: 10/617,355

(22) Filed: Jul. 11, 2003

(65) Prior Publication Data

US 2005/0010318 A1    Jan. 13, 2005

(51) Int. Cl.
*G06F 19/00* (2006.01)
(52) U.S. Cl. .......................... 700/109; 700/83; 702/81; 715/772
(58) Field of Classification Search .................. 700/17, 700/83, 109, 121; 702/81; 345/771, 772, 345/965; 715/771–772, 846
See application file for complete search history.

(56) References Cited

U.S. PATENT DOCUMENTS

| | | | | |
|---|---|---|---|---|
| 5,225,998 A | * | 7/1993 | Singhal | 702/84 |
| 5,440,478 A | * | 8/1995 | Fisher et al. | 700/109 |
| 5,450,326 A | * | 9/1995 | Black | 700/121 |
| 5,949,678 A | * | 9/1999 | Wold et al. | 700/83 |
| 6,097,204 A | * | 8/2000 | Tanaka et al. | 324/765 |
| 6,792,388 B2 | * | 9/2004 | Laitinen-Vellonen | 702/182 |
| 2003/0187523 A1 | * | 10/2003 | Smith et al. | 700/83 |
| 2003/0222896 A1 | * | 12/2003 | Hagmann et al. | 345/700 |
| 2003/0233387 A1 | * | 12/2003 | Watanabe et al. | 709/100 |

* cited by examiner

*Primary Examiner*—Leo Picard
*Assistant Examiner*—Alexander Kosowski
(74) *Attorney, Agent, or Firm*—Ernest J. Beffel, Jr.; Haynes Beffel & Wolfeld LLP

(57) ABSTRACT

A graphical user interface for enabling a user to graphically observe on a displaying mechanism a statistical measure of the process quality of a manufacturing process provides for the display of an icon representing a workpiece. The location and color of the icon on the displaying mechanism indicates the process quality of the manufacturing process for the represented workpiece.

30 Claims, 2 Drawing Sheets

GRAPHICAL USER INTERFACE WITH PROCESS QUALITY INDICATOR

FIELD OF THE INVENTION

The present invention relates to the field of manufacturing processes, such as semiconductor manufacturing processes, and a graphical user interface for such process.

BACKGROUND OF THE INVENTION

In modem manufacturing processes, it is generally desirable to provide as much control and automation as possible. In order to improve the processes as much as possible, and to provide as great a control as possible, large amounts of information are collected and analyzed that allow for refinement of the process and improve quality control.

For example, during a semiconductor manufacturing process, a large number of sensors can be used to monitor the processes and provide sensoric data to a processor. The data is processed and analyzed and adjustments are made to the processes as necessary based upon that analysis. The processor's analysis produces results that indicate values corresponding to a particular wafer that is either currently being processed or has been processed. The values are compared to known process parameters used in creating a "golden wafer", i.e., a desirable wafer. Statistical analysis yields the conformity of the examined process to the process that created the "golden wafer". If some parameter of the process is out of range, such that the process is not being properly performed, the values produced by the processor's statistical analysis will indicate this condition. At that point, an operator can modify the process for that particular wafer or in future wafer processing.

A problem with this approach is the need for a human operator to interpret the numerical value results and take appropriate action based upon the numbers provided by this statistical analysis of the processor. This is difficult to achieve in real time during the processing of the wafer, and also does not provide an intuitive feel to the operator as to when the process is not being performed properly.

There is a need for a system having a graphical user interface that provides a user with an intuitive feel for whether a process is being performed within acceptable limits.

SUMMARY OF THE INVENTION

This and other needs are met by embodiments of the present invention which provide a computing apparatus configured for operating a graphical user interface (GUI) for enabling a user to graphically observe a measure of process quality of a manufacturing process, comprising a displaying mechanism configured to display an icon representing a workpiece. Either the location and/or the color of the icon on the displaying mechanism indicates the process quality of the manufacturing process for the represented workpiece.

By providing a display mechanism that displays an icon with either the location and/or the color of the icon indicating process quality, a user of a system is provided with a fast and intuitive understanding of the manufacturing process as it relates to a desirable process.

In another aspect of the invention, a semiconductor manufacturing system is provided comprising a process tool and a sensor that senses the process parameter. A processor processes data related to the semiconductor manufacturing process. A display is configured to graphically display an icon representing a wafer, at least either the location and/or the color of the icon on the display indicating the process quality of the manufacturing process further represented workpiece.

The earlier stated needs are also met by another aspect of the present invention which provides a computer program product for supporting a terminal for enabling a user to graphically observe a measure of process quality of a manufacturing process. The computer program product comprises at least one sequence of computer executable instructions and a computer readable memory medium bearing the executable instructions in computer readable form. Execution of the instructions by a process causes the terminal to: display a screen having areas corresponding to the process quality of the manufacturing process, and generate an icon on the display representative of a workpiece subjected to the manufacturing process. The icon is positioned on the display in an area corresponding to the process quality of the represented workpiece.

The foregoing and other features, aspects and advantages of the present invention will become apparent from the following detailed description of the present invention when taken in conjunction with the accompanying drawings.

DETAILED DESCRIPTION OF THE INVENTION

The present invention addresses and solves problems related to the displaying of process information and determination of whether the quality of a process is within acceptable limits. This is achieved, in part, by a graphical user interface (GUI) that provides a visual indication to a user as to whether a process is being performed within acceptable parameters. This graphical depiction provides a user with an intuitive grasp of whether the process is being performed within acceptable limits or whether modifications need to be made to the process. The graphical nature of this analysis and depiction avoids a numerical analysis and interpretation by a human operator. Hence, less-skilled operators may be employed, and training for these operators may be reduced.

Figure 1:
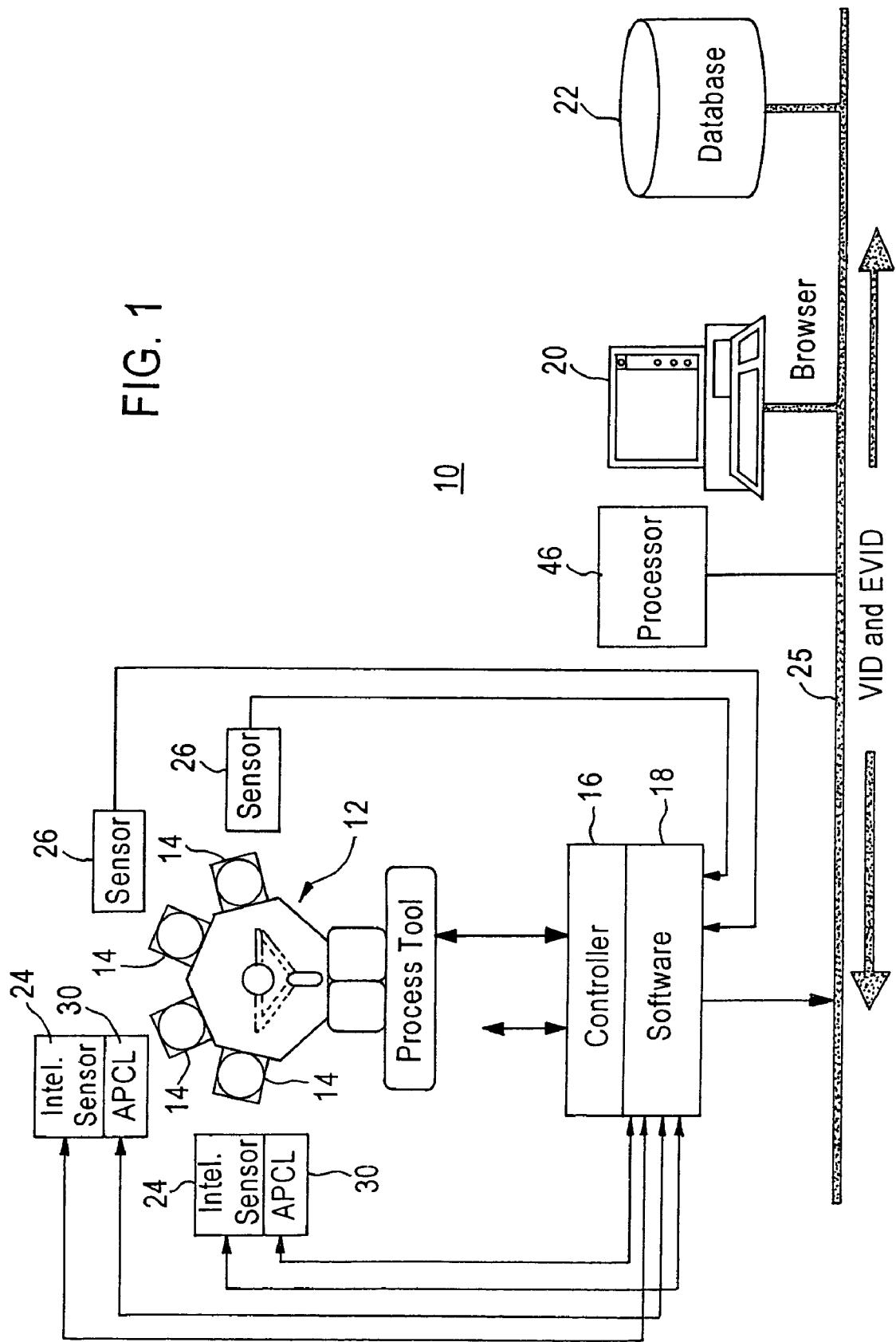
FIG. 1 is a schematic block diagram of an exemplary system for which the graphical user interface of the present invention finds utility.

FIG. 1 depicts in block diagram form an exemplary system constructed in accordance with an embodiment of the present invention. As described herein, the exemplary system is a semiconductor manufacturing system for manufacturing semiconductor products, such as semiconductor wafers. However, the present invention is not limited to such a system type, but can be applied to other manufacturing processes and systems. For illustrative purposes, however, the description of the exemplary embodiment of the invention provided below will be limited to a semiconductor manufacturing system.

The system 10 includes a semiconductor process tool 12 having one or more process chambers 14. The chambers can be of various types, such as deposition chambers, etchers, etc.

A process tool controller 16 is coupled to the process tool 12 and provides for the control of the process tool 12 in a substantially conventional manner. The process tool controller 16 interacts with software 18 (depicted as a separate block for illustrative purposes).

In the exemplary embodiment of the invention, system 10 is a web-based system having a browser 20 and a database 22 that are coupled to a data transmission network 25. An exemplary type of data transmission network 25 is an Ethernet network known to those of ordinary skill in the art. Other types of data transmission networks, such as wireless networks, may be employed without departing from the present invention. Browser 20 may compromise a conventional computer configured to perform browsing functions, process data and display results to a user. The displaying function will be described in greater detail later.

A number of sensors 24 and 26 are provided in or around the process tool 12. Sensors 24, 26 provide information regarding the various processes being performed. For purposes of this embodiment, there are considered to be two different sensor types, the first of these (sensor 26) being a "director parameter input sensor", or non-intelligent sensor. Such sensors generate a single value output correlated to one parameter of the process. An example of these sensors 26 includes a particle counter sensor which determines how many particles of a certain size are in a chamber 14 at a specific time for a specific wafer. Other examples include sensors detecting film thickness, resistivity, wafer bar code reading, pressure reading, flow reading, wafer temperature, etc. The other type of sensor is sensor 24 which is an "indirect parameter input sensor", or intelligent sensor. This type of sensor 24 generates indirect parameter inputs that are found through instrumentation that interprets intelligently what the sensor experiences. The interpretation is performed through mathematical, statistical, empirical, calculated and related methods. The parameters indicate quality and quantity indices. Such sensors 24 are commercially available. For example, sensor 24 may be a residual gas analysis (RGA) type of sensor, and provide both process and calculated indices. Other types of intelligent sensors include a VI probe that delivers the data necessary to perform plasma diagnostics. Still other types of intelligent sensors include pin point detectors, optical emission sensors, etc.

Through the sensors 24, 26, and the information contained in the database 22, the sensors 24, 26 perform processing and produces a graphical user interface displayed by the browser 20 as described below that enables the user to quickly ascertain whether the process being performed, or that has been performed, falls within acceptable parameters. In certain embodiments of the invention, a separate processor 46 performs the processing. This separate processor 46 may form part of a fab-level controller, for example.

Methods are known for analyzing large amounts of data, such as those provided by a plurality of sensors related to a process. These methods form a statistical analysis and comparison to a process that created a "golden wafer" and provide values that indicate the process quality for a particular semiconductor wafer or wafers. These known methods provide numerical values that indicate the process quality. However, such numbers do not provide an operator with an intuitive feel for whether a process is within acceptable parameters. The graphical user interface of the present invention provides such intuitive feel, both on a real-time basis and a post-processing basis.

Figure 2:
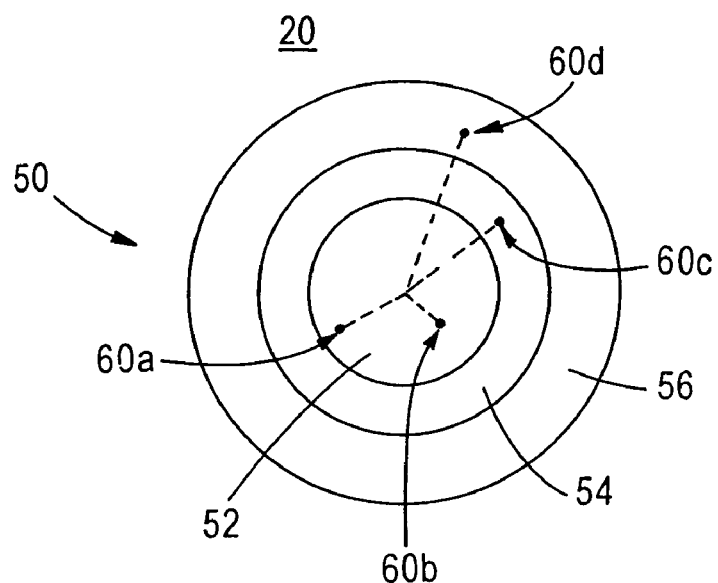
FIG. 2 is a schematic depiction of an exemplary embodiment of the graphical user interface in accordance with embodiments of the present invention.

Referring now to FIG. 2, an exemplary graphical user interface as presented to the user is depicted. The graphical user interface 50 may be displayed on the screen of the browser 20, for example.

The screen 50 depicted in FIG. 2 resembles a radar screen or bullseye target, with an inner concentric circle 52 and concentric circles 54 and 56. Each of these areas represent different levels of process quality, as will be described. Although described as concentric circles, the areas 54 and 56 are actually rings formed around the innermost circle 52.

A number of points are plotted on the interface 50. These points 60a–d represent the process quality of the workpiece (e.g., a semiconductor wafer) in specific process chambers 14. The value of the process quality is an inverse function of the radius from the center of the interface 50. Hence, wafers 60a and 60b represent wafers that are being processed with a higher process quality than wafers 60c and 60d. The greater the radius, the lower the process quality, for a process being performed on a particular semiconductor wafer.

The angular positions of the points 60a–60d provide a graphic indication to the user of the processing chamber 14 in which the respective semiconductor wafer is currently being processed.

The processed quality measure (or the "alarm level") is determined, for example, employing statistical measures. For example, in embodiments of the present invention, a Hotteling T2 measure may be used to determine the process quality. The Hotteling T2 is a well known statistical tool. It is a statistical measure of the multivariate distance of each observation from the center data set. Another measure that may be employed is DModX, which is a measure of how dissimilar a sample is from a population. In embodiments of the present invention, values for both the Hotteling T2 (here after "T2") and DModX are provided. In the embodiment of FIG. 2, both statistical measures are calculated, by processor 46, for example. These statistical measures are compared to those calculated for a golden wafer, which provides parameters T2-critical and DModX-critical in preferred embodiments of the invention. The alarm level (or process quality) is determined based on the ratio of the just-processed wafer and these critical values. Hence, the alarm level (or process quality) represents the worse of T2/T2-critical and DModX/DModX-critical. For display purposes, whichever value is considered to be "worse" will be displayed on the interface 50. By displaying the worse value of these two statistical measures of process quality, the user is more assuredly informed of potential problems in the processing of the semiconductor wafers or other workpieces.

The calculation of the level of an alarm (or process quality) using statistical analysis is well known. However, the present invention provides a graphical user interface 50 that provides the user with an intuitive and fast determination of process quality of any current process. The user does not have to review numbers or statistical charts in order to ascertain whether a process is within acceptable levels of process quality.

In certain embodiments of the invention, the concentric circles are color coded for ease of viewing. For example, the innermost circle 52 may be colored green, the next outermost ring or circle 54 may be colored yellow, and the outermost ring 56 may be colored red. Thus, in operation, the location of the point ("or icon") 60a–60d will indicate the acceptability of the process quality for a specific process. Icons 60a–60b are therefore, in this embodiment, considered "acceptable" in process quality. Icon 60c, located in the middle ring 54, is considered to have "marginally acceptable" process quality. Icon 60d, representing the process quality of a workpiece in a specific chamber, is considered to have a process quality that is "unacceptable". Using the commonly accepted green, yellow and red colors, a relatively inexperienced operator can quickly and intuitively understand which of the workpieces are being processed with acceptable, marginal or unacceptable process qualities.

The graphical user interface 50 of FIG. 2 represents a snap shot view of the current processing. It does not provide any statistical history of processed wafers.

Figure 3:
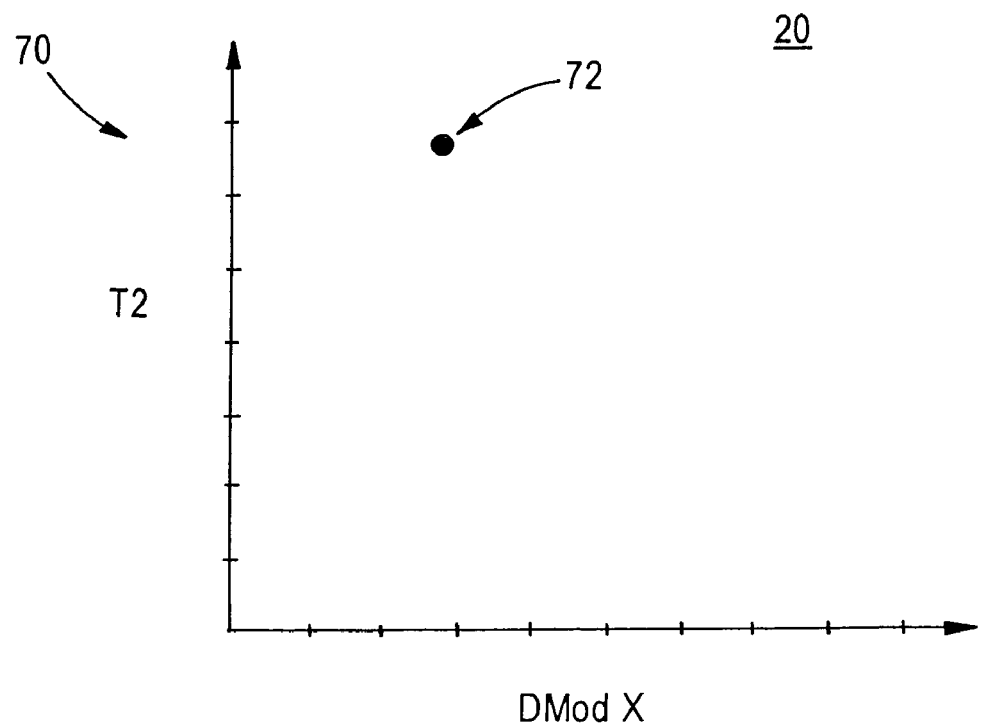
FIG. 3 is a schematic depiction of another embodiment of a graphical user interface constructed in accordance with embodiments of the present invention.

In an alternative embodiment depicted in FIG. 3, another graphical user interface 70 is shown and also provides a measure of process quality. In the graphical user interface 70, an X-Y grid is provided. A workpiece is represented by an icon 72. The location of the icon 72 in the grid 70 is based upon the statistical measures of the process quality for the represented workpiece. One statistical measure, such as DModX, may be plotted on the X axis, for example, while the T2 statistical measure may be plotted on the Y axis. Hence, the location of the icon 72 on the grid 70 provides a graphical and intuitive indication to a user as to the process quality of a represented workpiece according to two different measurements. The different statistical measures are then quickly determined, based upon the relative distances of the icon 72 from the X and Y axes, to process quality based on the respective statistical measures.

Although the location of the icon 72 on the grid 70 provides an accurate and intuitive numerical measurement of the process quality, it does not necessarily provide for a measure of the acceptability of this process quality in comparison to that of a desired process. This is achieved by the present invention, which performs a comparison of the values to a golden wafer process and color codes the icons 72 accordingly in preferred embodiments. This is done by using the ratios T2/T2-critical and DModX/DModX-critical, in certain embodiments. Thus, the icon 72 is provided with a different color in dependence on whether the measured process quality is considered to be acceptable, marginal or unacceptable. The color of the icon 72, in preferred embodiments, is the same as in the color of the region in the "radar screen" 50. For example, the icon 72 is colored green if the process quality is acceptable; yellow if the process quality is marginal; or red if the process quality is unacceptable. Like the embodiment of FIG. 2, the color of the icon 72 indicates the worse of the ratios.

With the graphical interface 70 depicted in FIG. 3, actual values for multiple statistical measures, such as T2 and DModX, as well as a determined acceptability level of the process quality, is quickly and graphically provided to a user.

Graphical interface 70, which can also be referred to as a "scatter screen", may have a number of points (icons) 72 plotted on the interface 70. Each icon 72 represents a different wafer and provide a history of the process quality for a specific chamber, or specific wafer, etc.

The graphical user interfaces 50, 70 allow for a user to quickly determine the wafer processes that are unacceptable and to determine the reasons for the unacceptability. A user that "clicks" on an icon 60 or 72 calls up screens (i.e., drills down) that provide information on a specific process that is currently or has been performed. Based on this information, the user can quickly ascertain the reason for the unacceptable process quality and take remedial measures.

Although the present invention has been described and illustrated in detail, it is to be clearly understood that the same is by of illustration and example only and is not to be taken by way of limitation, the scope of the present invention being limited only by the terms of the appended claims.

What is claimed is:

1. A computing apparatus configured for operating a graphical user interface (GUI) for enabling a user to graphically observe a measure of process quality of a manufacturing process, comprising: a displaying mechanism configured to display an icon representing a workpiece, at least one of the location and color of the icon on the displaying mechanism indicating the process quality and a stage of processing of the manufacturing process for the represented workpiece.

2. The apparatus of claim 1, wherein the display mechanism is configured to display concentric circles, each of the circles indicating a different process quality of the manufacturing process.

3. The apparatus of claim 2, wherein an innermost one of the concentric circles indicates a highest process quality, a next outermost one of the concentric circles indicates a lesser process quality, and a still next outermost one of the concentric circles indicates a still lesser process quality.

4. The apparatus of claim 2, wherein the displaying mechanism is configured to display the icon in the concentric circle corresponding to the process quality or the manufacturing process for the represented workpiece.

5. The apparatus of claim 1, wherein the displaying mechanism is configured to display a grid with an X-axis and a Y-axis, the position of the icon in the grid in the X-direction indicating a first measure of the process quality of the manufacturing process for the represented workpiece and the position of the icon in the grid in the Y-direction indicating a second measure of the process quality of the manufacturing process for the represented workpiece.

6. The apparatus of claim 1, wherein the workpiece is a semiconductor wafer.

7. The computing apparatus of claim 1, wherein the stage of processing of the manufacturing process includes a type of processing chamber.

8. A computing apparatus configured for operating a graphical user interface (GUI) for enabling a user to graphically observe a measure of process quality of a manufacturing process, comprising:
a displaying mechanism configured to display an icon representing a workpiece, at least one of the location and color of the icon on the displaying mechanism indicating the process quality of the manufacturing process for the represented workpiece,
wherein the display mechanism is configured to display concentric circles, each of the circles indicating a different process quality of the manufacturing process,
wherein each of the concentric circles has a different color.

9. The apparatus of claim 8, wherein the innermost concentric circle is green; the next outermost one of the concentric circles is yellow; and the still next outermost one of the concentric circles is red.

10. The apparatus of claim 9, wherein a display of the icon in the green concentric circle indicates the process quality for the represented workpiece is acceptable; in the yellow circle indicates the process quality for the represented workpiece is marginal; and in the red circle indicates the process quality is unacceptable.

11. The apparatus of claim 10, wherein a radius of the icon from the center of the concentric circles is a function of the worse of T2/T2-critical and DModX/DModX-critical.

12. The apparatus of claim 11, wherein the workpiece is a semiconductor wafer.

13. A computing apparatus configured for operating a graphical user interface (GUI) for enabling a user to graphically observe a measure of process quality of a manufacturing process, comprising:
a displaying mechanism configured to display an icon representing a workpiece, at least one of the location and color of the icon on the displaying mechanism indicating the process quality of the manufacturing process for the represented workpiece, wherein the displaying mechanism is configured to display a grid with an X-axis and a Y-axis, the position of the icon in the grid in the X-direction indicating a first measure of the process quality of the manufacturing process for the represented workpiece and the position of the icon in the grid in the Y-direction indicating a second measure of the process quality of the manufacturing process for the represented workpiece, wherein the displaying mechanism is configured to display the icon in different colors, the different colors representing acceptability of the process quality of the manufacturing process for the represented workpiece, the color being selected as a function of the worse alarm level of DModX and T2.

14. The apparatus of claim 13, wherein the icon is displayed in green to indicate an acceptable process quality; yellow to indicate a marginal process quality; and red to indicate an unacceptable process quality.

15. The apparatus of claim 14, wherein the workpiece is a semiconductor wafer.

16. A semiconductor manufacturing system comprising:
a process tool;
a sensor that senses a process parameter;
a processor that processes data related to a semiconductor manufacturing process; and
a display configured to graphically display an icon representing a wafer, at least one of the location and color of the icon on the display indicating the process quality of the manufacturing process and a stage of processing for the represented wafer.

17. The system of claim 16, wherein the display mechanism is configured to display concentric circles, the circles indicating different process quality of the manufacturing process.

18. The system of claim 17, wherein an innermost one of the concentric circles indicates a highest process quality, a next outermost one of the concentric circles indicates a lesser process quality, and a still next outermost one of the concentric circles indicates a still lesser process quality.

19. The system of claim 18, wherein the displaying mechanism is configured to display the icon in the concentric circle corresponding to the process quality of the manufacturing process for the represented wafer.

20. The semiconductor manufacturing system of claim 16, wherein the stage of processing of the manufacturing process includes a type of processing chamber.

21. The system of claim 16, wherein the displaying mechanism is configured to display a grid with an X-axis and a Y-axis, the position of the icon in the grid in the X-direction indicating a first measure of the process quality of the manufacturing process for the represented water and the position of the icon in the grid in the Y-direction indicating a second measure of the process quality of the manufacturing process for the represented wafer.

22. A semiconductor manufacturing system comprising:
a process tool;
a sensor that senses a process parameter;
a processor that processes data related to a semiconductor manufacturing process; and
a display configured to graphically display an icon representing a wafer, at least one of the location and color of the icon on the display indicating the process quality of the manufacturing process for the represented wafer,
wherein the display mechanism is configured to display concentric circles, the circles indicating different process quality of the manufacturing process,
wherein an innermost one of the concentric circles indicates a highest process quality, a next outermost one of the concentric circles indicates a lesser process quality, and a still next outermost one of the concentric circles indicates a still lesser process quality,
wherein the displaying mechanism is configured to display the icon in the concentric circle corresponding to the process quality of the manufacturing process for the represented wafer,
wherein each of the concentric circles has a different color.

23. The system of claim 22, wherein the innermost concentric circle is green; the next outermost one of the concentric circles is yellow; and the still next outermost one of the concentric circles is red.

24. The system of claim 23, wherein a display of the icon in the green concentric circle indicates the process quality for the represented wafer is acceptable; in the yellow circle indicates the process quality for the represented wafer is marginal; and in the red circle indicates the process quality is unacceptable.

25. The system of claim 24, wherein the wafer is a semiconductor wafer.

26. A semiconductor manufacturing system comprising:
a process tool;
a sensor that senses a process parameter;
a processor that processes data related to a semiconductor manufacturing process; and
a display configured to graphically display an icon representing a wafer, at least one of the location and color of the icon on the display indicating the process quality of the manufacturing process for the represented wafer,
wherein the displaying mechanism is configured to display a grid with an X-axis and a Y-axis, the position of the icon in the grid in the X-direction indicating a first measure of the process quality of the manufacturing process for the represented wafer and the position of the icon in the grid in the Y-direction indicating a second measure of the process quality of the manufacturing process for the represented wafer
wherein the displaying mechanism is configured to display the icon in different colors, the different colors representing acceptability of the process quality of the manufacturing process for the represented wafer.

27. The system of claim 26, wherein the icon is displayed in green to indicate an acceptable process quality; yellow to indicate a marginal process quality; and red to indicate an unacceptable process quality.

28. A computer program product for supporting a terminal for enabling a user to graphically observe a measure of process quality of a manufacturing process, comprising:
at least one sequence of computer executable instructions; and
a computer readable memory medium bearing the executable instructions in computer readable form, wherein execution of the instructions by a processor causes the terminal to:
display a screen having areas corresponding to process quality of the manufacturing process; and
generate an icon on the display representative of a workpiece subjected to the manufacturing process; and
position the icon on the display in an area corresponding to the process quality and a stage of processing of the represented workpiece.

29. The product of claim 28, wherein execution of the instructions by the processor further causes the terminal to color the icon with a color that indicates acceptability of the process quality of the represented workpiece.

30. The product of claim 28, wherein the stage of processing of the manufacturing process includes a type of processing chamber.

* * * * *